(12) United States Patent
Knatchbull-Hugessen et al.

(10) Patent No.: US 11,149,975 B2
(45) Date of Patent: Oct. 19, 2021

(54) ADAPTIVE THERMAL COMFORT LEARNING FOR OPTIMIZED HVAC CONTROL

(71) Applicant: Uplight, Inc., Boulder, CO (US)

(72) Inventors: Adriana Knatchbull-Hugessen, Boulder, CO (US); Brett Feldman, Boulder, CO (US); Taylor Names, Boulder, CO (US)

(73) Assignee: Uplight, Inc., Boulder, CO (US)

( * ) Notice: Subject to any disclaimer, the term of this patent is extended or adjusted under 35 U.S.C. 154(b) by 0 days.

(21) Appl. No.: 16/936,314

(22) Filed: Jul. 22, 2020

(65) Prior Publication Data
US 2021/0025613 A1 Jan. 28, 2021

Related U.S. Application Data

(60) Provisional application No. 62/878,303, filed on Jul. 24, 2019.

(51) Int. Cl.
*F24F 11/47* (2018.01)
*F24F 11/52* (2018.01)
(Continued)

(52) U.S. Cl.
CPC .............. *F24F 11/47* (2018.01); *F24F 11/52* (2018.01); *F24F 11/64* (2018.01); *F24F 11/80* (2018.01);
(Continued)

(58) Field of Classification Search
CPC .............. F24F 11/47; F24F 11/52; F24F 11/64
See application file for complete search history.

(56) References Cited

U.S. PATENT DOCUMENTS 4,042,013 A 8/1977 Demaray et al.
4,401,943 A 8/1983 Morris
(Continued)

FOREIGN PATENT DOCUMENTS

WO 0074306 12/2000
WO 2012068503 A1 5/2012
WO 2014085777 A1 6/2014

OTHER PUBLICATIONS

International Searching Authority, International Search Report and Written Opinion, PCT Patent Application PCT/US2020/043149, dated Sep. 28, 2020, 11 pages.
(Continued)

*Primary Examiner* — Mohammad Ali
*Assistant Examiner* — Vincent W Chang
(74) *Attorney, Agent, or Firm* — Perkins Coie LLP

(57) ABSTRACT

A facility providing systems and methods for managing and optimizing thermal comfort is provided. The facility is a software algorithm that intelligently detects the thermal comfort preferences of residential smart thermostat users, where a user's "comfort preference" is defined to refer to an estimate of a measurement of the user's comfort across varying values of some set of exogenous factors, including but not limited to indoor temperature, the time of day, the day of the week, and weather conditions. This facility encompasses the use of this "comfort preference" for the creation of an optimal schedule of setpoints for a residential thermostat which is configured to optimize some objective, including potentially user comfort, energy efficiency, load shift, or cost.

25 Claims, 7 Drawing Sheets

(51) Int. Cl.
*F24F 11/64* (2018.01)
*F24F 11/80* (2018.01)
*F24F 140/60* (2018.01)
*F24F 110/10* (2018.01)
*F24F 120/00* (2018.01)
*F24F 140/50* (2018.01)

(52) U.S. Cl.
CPC ....... *F24F 2110/10* (2018.01); *F24F 2120/00* (2018.01); *F24F 2140/50* (2018.01); *F24F 2140/60* (2018.01)

(56) References Cited

U.S. PATENT DOCUMENTS

| | | |
|---|---|---|
| 4,475,685 A | 10/1984 | Grimado et al. |
| 5,179,556 A | 1/1993 | Turner |
| 5,510,975 A | 4/1996 | Ziegler |
| 5,572,438 A | 11/1996 | Ehlers et al. |
| 5,684,710 A | 11/1997 | Ehlers et al. |
| 5,696,695 A | 12/1997 | Ehlers et al. |
| 5,719,861 A | 2/1998 | Okanoue |
| 5,865,991 A | 2/1999 | Hsu |
| 5,924,486 A | 7/1999 | Ehlers et al. |
| 5,949,976 A | 9/1999 | Chappelle |
| 5,959,529 A | 9/1999 | Kail |
| 6,028,857 A | 2/2000 | Poor |
| 6,092,207 A | 7/2000 | Kolinski et al. |
| 6,178,362 B1 | 1/2001 | Woolard et al. |
| 6,208,247 B1 | 3/2001 | Agre et al. |
| 6,216,956 B1 | 4/2001 | Ehlers et al. |
| 6,498,955 B1 | 12/2002 | McCarthy et al. |
| 6,631,309 B2 | 10/2003 | Boies et al. |
| 6,640,248 B1 | 10/2003 | Jorgensen |
| 6,680,922 B1 | 1/2004 | Jorgensen |
| 6,684,339 B1 | 1/2004 | Willig |
| 6,754,504 B1 | 6/2004 | Reed |
| 6,785,592 B1 | 8/2004 | Smith et al. |
| 6,859,831 B1 | 2/2005 | Gelvin et al. |
| 6,947,483 B2 | 9/2005 | Engwer |
| 7,058,657 B1 | 6/2006 | Berno |
| 7,062,389 B2 | 6/2006 | Johnson et al. |
| 7,130,719 B2 | 10/2006 | Ehlers et al. |
| 7,171,287 B2 | 1/2007 | Weiss |
| 7,216,021 B2 | 5/2007 | Matsubara et al. |
| 7,245,947 B2 | 7/2007 | Salokannel et al. |
| 7,263,450 B2 | 8/2007 | Hunter |
| 7,266,428 B2 | 9/2007 | Alexanian |
| 7,302,634 B2 | 11/2007 | Lucovsky et al. |
| 7,333,821 B2 | 2/2008 | Willey |
| 7,356,548 B1 | 4/2008 | Culp et al. |
| 7,364,093 B2 | 4/2008 | Garozzo |
| 7,505,852 B2 | 3/2009 | Board |
| 7,539,488 B2 | 5/2009 | Friedman |
| 7,552,033 B1 | 6/2009 | Culp et al. |
| 7,769,611 B1 | 8/2010 | Rodriguez et al. |
| 7,966,104 B2 | 6/2011 | Srivastava et al. |
| 8,010,240 B2 | 8/2011 | Mattiocco et al. |
| 8,014,905 B2 | 9/2011 | Ehlers |
| 8,121,741 B2 | 2/2012 | Taft et al. |
| 8,175,756 B2 | 5/2012 | Musti et al. |
| 8,176,095 B2 | 5/2012 | Murray et al. |
| 8,239,046 B2 | 8/2012 | Koehler et al. |
| 8,265,776 B2 | 9/2012 | Osann |
| 8,301,921 B2 | 10/2012 | Goodnow et al. |
| 8,332,055 B2 | 12/2012 | Veillette |
| 8,510,255 B2 | 8/2013 | Fadell et al. |
| 8,515,878 B2 | 8/2013 | Radloff et al. |
| 8,543,251 B2 | 9/2013 | Plant |
| 8,549,335 B2 | 10/2013 | Goodnow et al. |
| 8,554,376 B1 | 10/2013 | Matsuoka et al. |
| 8,560,128 B2 | 10/2013 | Satterthwaite et al. |
| 8,583,531 B2 | 11/2013 | Hirl |
| 8,674,843 B2 | 3/2014 | Bhageria et al. |
| 8,730,057 B2 | 5/2014 | Dalla |
| 8,761,945 B2 | 6/2014 | Hadzidedic |
| 8,872,667 B2 | 10/2014 | Bhageria et al. |
| 8,892,264 B2 | 11/2014 | Steven et al. |
| 8,977,404 B2 | 3/2015 | Benes et al. |
| 9,003,343 B2 | 4/2015 | Zhou et al. |
| 9,007,077 B2 | 4/2015 | El-Essawy et al. |
| 9,026,261 B2 | 5/2015 | Bukhin et al. |
| 9,244,446 B2 | 1/2016 | Bhageria et al. |
| 9,256,908 B2 | 2/2016 | Dai et al. |
| 9,298,197 B2 | 3/2016 | Matsuoka et al. |
| 9,310,815 B2 | 4/2016 | Shiflet |
| 9,329,212 B2 | 5/2016 | Benes et al. |
| 9,423,779 B2 | 8/2016 | Agarwal |
| 9,471,718 B2 | 10/2016 | Bukhin et al. |
| 9,576,472 B2 | 2/2017 | Koch |
| 9,696,055 B1 | 7/2017 | Goodman et al. |
| 9,722,813 B2 | 8/2017 | Benes et al. |
| 9,785,129 B2 | 10/2017 | Bhageria et al. |
| 9,923,416 B2 | 3/2018 | Bhageria et al. |
| 10,007,243 B2 | 6/2018 | Bhageria et al. |
| 10,281,895 B2 | 5/2019 | Agarwal |
| 10,379,508 B2 | 8/2019 | Shiflet |
| 10,697,662 B2 | 6/2020 | Matsuoka et al. |
| 10,708,077 B2 | 7/2020 | Cui et al. |
| 10,911,256 B2 | 2/2021 | Benes et al. |
| 11,023,919 B2 | 6/2021 | Lurie et al. |
| 11,042,141 B2 | 6/2021 | Shiflet |
| 2002/0002636 A1 | 1/2002 | Vange et al. |
| 2002/0071398 A1 | 6/2002 | Moran et al. |
| 2002/0158763 A1 | 10/2002 | Takarada et al. |
| 2003/0069970 A1 | 4/2003 | Kim et al. |
| 2003/0083758 A1 | 5/2003 | Williamson |
| 2003/0190912 A1 | 10/2003 | Jampolsky et al. |
| 2003/0191955 A1 | 10/2003 | Wagner et al. |
| 2003/0216837 A1 | 11/2003 | Reich et al. |
| 2004/0034684 A1 | 2/2004 | Payne |
| 2004/0117330 A1 | 6/2004 | Ehlers et al. |
| 2004/0133314 A1 | 7/2004 | Ehlers et al. |
| 2004/0138981 A1 | 7/2004 | Ehlers et al. |
| 2004/0139038 A1 | 7/2004 | Ehlers et al. |
| 2004/0249515 A1 | 12/2004 | Johnson et al. |
| 2004/0260411 A1 | 12/2004 | Cannon |
| 2004/0262410 A1 | 12/2004 | Hull |
| 2005/0038571 A1 | 2/2005 | Brickfield et al. |
| 2005/0043829 A1 | 2/2005 | Rossides |
| 2005/0055137 A1 | 3/2005 | Andren et al. |
| 2005/0060107 A1 | 3/2005 | Rodenberg et al. |
| 2005/0095978 A1 | 5/2005 | Blunn et al. |
| 2005/0096060 A1 | 5/2005 | Rajkotia et al. |
| 2005/0096857 A1 | 5/2005 | Hunter |
| 2005/0124358 A1 | 6/2005 | Willey |
| 2005/0125083 A1 | 6/2005 | Kiko |
| 2005/0157723 A1 | 7/2005 | Kim et al. |
| 2005/0171645 A1 | 8/2005 | Oswald et al. |
| 2006/0005046 A1 | 1/2006 | Hars |
| 2006/0143600 A1 | 6/2006 | Cottrell et al. |
| 2006/0200542 A1 | 9/2006 | Willig |
| 2006/0200658 A1 | 9/2006 | Penkethman |
| 2006/0209789 A1 | 9/2006 | Gupta et al. |
| 2006/0276938 A1 | 12/2006 | Miller |
| 2007/0043477 A1 | 2/2007 | Ehlers et al. |
| 2007/0043478 A1 | 2/2007 | Ehlers et al. |
| 2007/0045431 A1 | 3/2007 | Chapman et al. |
| 2007/0097993 A1 | 5/2007 | Bojahra et al. |
| 2007/0173978 A1 | 7/2007 | Fein et al. |
| 2007/0174644 A1 | 7/2007 | Willig |
| 2007/0239317 A1 | 10/2007 | Bogolea et al. |
| 2007/0251461 A1 | 11/2007 | Reichard et al. |
| 2008/0021749 A1 | 1/2008 | Hope |
| 2008/0065816 A1 | 3/2008 | Seo |
| 2008/0129495 A1 | 6/2008 | Hitt |
| 2008/0256445 A1 | 10/2008 | Ziff et al. |
| 2008/0263196 A1 | 10/2008 | Kansal et al. |
| 2008/0271123 A1 | 10/2008 | Ollis et al. |
| 2008/0277486 A1 | 11/2008 | Seem et al. |
| 2008/0300906 A1 | 12/2008 | Doi et al. |
| 2008/0306985 A1 | 12/2008 | Murray et al. |
| 2009/0007706 A1 | 1/2009 | Hitt et al. |
| 2009/0045256 A1 | 2/2009 | Mcinerney et al. |
| 2009/0059842 A1 | 3/2009 | Maltseff et al. |

(56) References Cited

U.S. PATENT DOCUMENTS

| | | |
|---|---|---|
| 2009/0115597 A1 | 5/2009 | Giacalone |
| 2009/0135018 A1 | 5/2009 | Veillette et al. |
| 2009/0135836 A1 | 5/2009 | Veillette |
| 2009/0320012 A1 | 12/2009 | Lee et al. |
| 2010/0010678 A1 | 1/2010 | Dawson et al. |
| 2010/0031324 A1 | 2/2010 | Strich et al. |
| 2010/0042453 A1 | 2/2010 | Scaramellino et al. |
| 2010/0042720 A1 | 2/2010 | Stienhans et al. |
| 2010/0070101 A1 | 3/2010 | Benes et al. |
| 2010/0070102 A1 | 3/2010 | Benes et al. |
| 2010/0097225 A1 | 4/2010 | Petricoin |
| 2010/0100253 A1 | 4/2010 | Fausak et al. |
| 2010/0107112 A1 | 4/2010 | Jennings et al. |
| 2010/0156665 A1 | 6/2010 | Krzyzanowski et al. |
| 2011/0029341 A1 | 2/2011 | Muse et al. |
| 2011/0032070 A1 | 2/2011 | Bleile |
| 2011/0040785 A1 | 2/2011 | Steenberg et al. |
| 2011/0046805 A1 | 2/2011 | Bedros et al. |
| 2011/0144932 A1 | 6/2011 | Alles |
| 2011/0166710 A1 | 7/2011 | Kordik et al. |
| 2011/0227417 A1 | 9/2011 | Walker |
| 2011/0231320 A1 | 9/2011 | Irving |
| 2011/0251807 A1 | 10/2011 | Rada et al. |
| 2011/0282808 A1 | 11/2011 | Amram et al. |
| 2011/0289019 A1 | 11/2011 | Radloff et al. |
| 2011/0313964 A1 | 12/2011 | Sanchey Loureda et al. |
| 2012/0029717 A1 | 2/2012 | Cox et al. |
| 2012/0053740 A1 | 3/2012 | Venkatakrishnan et al. |
| 2012/0065789 A1 | 3/2012 | Scelzi et al. |
| 2012/0079092 A1 | 3/2012 | Woxblom et al. |
| 2012/0101651 A1 | 4/2012 | Haynes |
| 2012/0173456 A1 | 7/2012 | Hirl |
| 2012/0203379 A1 | 8/2012 | Sloo et al. |
| 2012/0246279 A1 | 9/2012 | Zang et al. |
| 2012/0316687 A1 | 12/2012 | Chen et al. |
| 2012/0323637 A1 | 12/2012 | Cushing et al. |
| 2013/0013121 A1 | 1/2013 | Henze et al. |
| 2013/0103207 A1 | 4/2013 | Ruff et al. |
| 2013/0151012 A1 | 6/2013 | Shetty et al. |
| 2013/0170481 A1 | 7/2013 | Crawford et al. |
| 2013/0178986 A1 | 7/2013 | Lombard et al. |
| 2014/0039690 A1 | 2/2014 | Steinberg et al. |
| 2014/0101082 A1 | 4/2014 | Matsuoka et al. |
| 2014/0222241 A1 | 8/2014 | Ols |
| 2014/0277761 A1 | 9/2014 | Matsuoka et al. |
| 2014/0297001 A1 | 10/2014 | Silverman et al. |
| 2014/0309869 A1 | 10/2014 | Ricci |
| 2014/0309892 A1 | 10/2014 | Ricci |
| 2014/0371921 A1 | 12/2014 | Weaver et al. |
| 2015/0032264 A1 | 1/2015 | Emmons et al. |
| 2015/0100167 A1 | 4/2015 | Sloo et al. |
| 2015/0168002 A1 | 6/2015 | Plitkins et al. |
| 2015/0178421 A1 | 6/2015 | Borrell et al. |
| 2015/0198346 A1 | 7/2015 | Vedpathak |
| 2015/0248118 A1 | 9/2015 | Li et al. |
| 2015/0277409 A1 | 10/2015 | Yamada |
| 2015/0369847 A1 | 12/2015 | Roosli |
| 2016/0088438 A1 | 3/2016 | Okeeffe |
| 2016/0131388 A1 | 5/2016 | Eiynk et al. |
| 2016/0201934 A1 | 7/2016 | Hester et al. |
| 2016/0313751 A1 | 10/2016 | Risbeck et al. |
| 2017/0055126 A1 | 2/2017 | O'Keeffe |
| 2017/0288401 A1* | 10/2017 | Hummon ............ G05B 15/02 |
| 2018/0136621 A1 | 5/2018 | Buda et al. |
| 2019/0242608 A1* | 8/2019 | Laftchiev ............ G05B 15/02 |
| 2019/0338974 A1* | 11/2019 | Turney ................ F24F 11/56 |

OTHER PUBLICATIONS

Ahmad et al. "Computational intelligence techniques for HVAC systems: A review." Building Simulation, Tsinghua University Press, vol. 9, No. 4, Mar. 31, 2016, pp. 359-398.

An, Lianjun et al. "An inverse PDE-ODE model for studying building energy demand." Proceedings of the 2013 Winter Simulation Conference, Dec. 8, 2013, pp. 1869-1880.

De Angelis et al. Optimal Home Energy Management Under Dynamic Electrical and Thermal Constraints, IEEE Transactions on Industrial Informatics; vol. 9, Issue. 3; 1518-1527, 2012, 12 pages.

European Patent Office, Extended European Search Report, EP Patent Application 17776874.4, dated Nov. 13, 2019, 13 pages.

International Search Report and Written Opinion dated Jun. 21, 2017, for International Patent Application No. PCT/US2017/025606filed Mar. 31, 2017, 53 pages.

Vakiloroaya et al. "A review of different strategies for HVAC energy saving." Energy, Conversion and Management; vol. 77; 735-754, 2014, 19 pages.

Bullis, Kevin, "Dumb Meters Get Smarter," <http://www.technologyreview.com/energy/22366>, Mar. 31, 2009, 2 pages.

Dave's Tech Blog, "Itron Remote Read Electric Meter," <http://davestech.blogspot.com/2008/02/itron-remote-read-electric-meter.html>, internet accessed on Nov. 8, 2010, 22 pages.

Doebber, I. "Investigation of Concrete Wall Systems for Reducing Heating and Cooling Requirements in Single Family Residences" [online], Sep. 2004 [retrieved on Mar. 9, 2014], Retrieved from the Internet:<URL: http://scholar.lib.vt.edu/theses/available/.

Extended European Search Report; European Patent Application No. 13824847.1; dated Jun. 7, 2016; 7 pages.

Hancock, Gregory, "Power monitoring to the people!" <http://www.gridinsight.com/2009/02/power-monitoring-to-the-people.html>, Feb. 25, 2009, 4 pages.

http://blog.microsoft-hohm.com/Hohm-energy-report-sample.aspx, accessed on Aug. 9, 2010.

http://efficiency20.com/, accessed on Aug. 9, 2010.

http://hes.lbl.gov/consumer, accessed on Aug. 9, 2010.

http://onzo.com/solutions/, accessed on Aug. 9, 2010.

http://silverspringnetworks.com/products/index.html, accessed on Aug. 9, 2010.

http://www.agilewaves.com/, accessed on Aug. 9, 2010.

http://www.alertme.com/, accessed on Aug. 9, 2010.

http://www.ambientdevices.com/products/energyjoule.html, accessed on Aug. 9, 2010.

http://www.bluelineinnovations.com, accessed on Aug. 9, 2010.

http://www.consert.com/, accessed on Aug. 9, 2010.

http://www.diykyoto.com/, accessed on Aug. 9, 2010.

http://www.energy-aware.com/, accessed on Aug. 9, 2010.

http://www.energyhub.net, accessed on Aug. 9, 2010.

http://www.google.com/powermeter/about/, accessed on Aug. 9, 2010.

http://www.greenenergyoptions.co.uk/, accessed on Aug. 9, 2010.

http://www.lem.com/hq/en/content/view/276/215/, accessed on Aug. 9, 2010.

http://www.opower.com/Products/Overview.aspx, accessed on Aug. 9, 2010.

http://www.powermand.com/dreamwatts-product, accessed on Aug. 9, 2010.

http://www.tendrilinc.com/products/vision/,accessed on Aug. 9, 2010.

http://www.theenergydetective.com/home, accessed on Aug. 9, 2010.

http://www.theowl.com/, accessed on Aug. 9, 2010.

International Preliminary Report on Patentability and Written Opinion; International Patent Application No. PCT/US2013/053317; Applicant Tendril Networks, Inc.; dated Feb. 12, 2015; 8 Pages.

International Search Report and Written Opinion; International Application No. PCT/US2011/061470; dated Apr. 9, 2014; 9 pages.

James Broberg, Rajkumar Buyya, Zhair Tari; MetaCDN: Harnessing 'Storage Clouds' for high performance content delivery; online publication date; 14 pages. Apr. 5, 2009: http://www.sciencedirect.com/science/article/pii/S1084804509000514.

Kennedy, James and Russell Eberhart. "Particle Swarm Optimization," Proceedings of the IEEE International Conference on Neural Networks (Perth, Australia), 1995, pp. 1942-1948.

Retzlaff et al. "Conservation & Energy Potential Study for Smith River Rancheria", Smith River Rancheria, Evergreen NRG/Strategic Energy Solutions, Aug. 2005, 417 pages.

U.S. Appl. No. 61/446,233; Inventor: Henze, filed Feb. 24, 2011, 17 pages.

(56) References Cited

OTHER PUBLICATIONS

Econorthwest, "Process Evaluation of the SCE Aug. 2006 Home Energy Efficiency Survey (HEES) Program," Aug. 2009. <URL: http://www.calmac.org/publications/SCE_HEES_Final_Report_080409_calmac_edit.pdf> entire document, 121 Pages.
"WIPO International Search Report and Written Opinion," PCT/US2014/029543, dated Sep. 19, 2014, 12 pages.

* cited by examiner historical data 300

| user | day(s) | time | thermostat | inside temperature | outside temperature | humidity | comfortable | not comfortable | ... |
|---|---|---|---|---|---|---|---|---|---|
| 0001 | weekends | 13:00 | 71 | 70 | 75 | 20 | 22 | 68 | ... |
| 0001 | weekends | 13:00 | 72 | 72 | 75 | 20 | 23 | 87 | ... |
| 0001 | weekends | 13:00 | 73 | 72 | 75 | 20 | 0 | 51 | ... |
| 0001 | weekends | 15:00 | 70 | 70 | 75 | 20 | 42 | 37 | ... |
| 0001 | weekdays | 06:00 | 69 | 68 | 75 | 20 | 86 | 12 | ... |
| 0001 | weekdays | 08:00 | 67 | 68 | 75 | 20 | 165 | 22 | ... |
| 0002 | M, W, F | 11:30 | 68 | 68 | 75 | 20 | 85 | 12 | ... |
| 0002 | T, Th | 14:30 | 66 | 66 | 75 | 20 | 112 | 7 | ... |
| ... | ... | ... | ... | ... | ... | ... | ... | ... | ... |
|  | ALL | 21:30 | 65 | 66 | 75 | 20 | 24 | 12 | ... |

301
302
303
304
305
306
307
308
309
310

*FIG. 3* comfort surface data — Outside Temperature = 55°F; Day(s) = {Su, M, Tu, W, Th, F, Sa}

| | 79 | 78 | 77 | 76 | 75 | 74 | 73 | 72 | 71 | 70 | 69 | 68 | 67 | 66 | 65 | ... | 50 | |
|---|---|---|---|---|---|---|---|---|---|---|---|---|---|---|---|---|---|---|
| | 0 | 0 | 10 | 13 | 20 | 30 | 67 | 77 | 80 | 90 | 100 | 100 | 100 | 92 | 85 | ... | 0 | 0 |
| | 0 | 0 | 10 | 13 | 20 | 30 | 67 | 75 | 80 | 90 | 100 | 100 | 100 | 92 | 85 | ... | 0 | 1 |
| | 0 | 0 | 10 | 13 | 20 | 30 | 67 | 75 | 80 | 90 | 100 | 100 | 100 | 92 | 85 | ... | 0 | 2 |
| | 0 | 0 | 10 | 13 | 20 | 30 | 67 | 75 | 80 | 90 | 100 | 100 | 100 | 92 | 85 | ... | 0 | 3 |
| | 0 | 0 | 10 | 13 | 20 | 30 | 67 | 75 | 80 | 90 | 100 | 100 | 100 | 92 | 85 | ... | 0 | 4 |
| | 0 | 0 | 10 | 13 | 20 | 25 | 67 | 75 | 80 | 90 | 100 | 100 | 100 | 92 | 85 | ... | 0 | 5 |
| | 0 | 0 | 10 | 12 | 15 | 25 | 66 | 74 | 75 | 90 | 100 | 100 | 100 | 85 | 77 | ... | 0 | 6 |
| | 0 | 0 | 10 | 12 | 15 | 22 | 66 | 74 | 75 | 90 | 100 | 100 | 100 | 85 | 75 | ... | 0 | 7 |
| | 0 | 0 | 10 | 12 | 15 | 21 | 66 | 74 | 75 | 90 | 100 | 100 | 100 | 85 | 75 | ... | 0 | 8 |
| | 0 | 0 | 10 | 11 | 15 | 21 | 65 | 74 | 75 | 90 | 100 | 100 | 100 | 85 | 75 | ... | 0 | 9 |
| | 0 | 0 | 10 | 11 | 15 | 21 | 65 | 74 | 75 | 90 | 100 | 100 | 100 | 85 | 75 | ... | 0 | 10 |
| | 0 | 0 | 10 | 11 | 15 | 21 | 65 | 74 | 75 | 90 | 100 | 100 | 100 | 85 | 75 | ... | 0 | 11 |
| | 0 | 0 | 10 | 10 | 15 | 22 | 65 | 74 | 75 | 90 | 100 | 100 | 100 | 85 | 75 | ... | 0 | 12 |
| | 0 | 0 | 10 | 11 | 15 | 22 | 65 | 74 | 75 | 90 | 100 | 100 | 100 | 85 | 75 | ... | 0 | 13 |
| | 0 | 0 | 10 | 11 | 15 | 23 | 65 | 74 | 75 | 90 | 100 | 100 | 100 | 85 | 75 | ... | 0 | 14 |
| | 0 | 0 | 10 | 12 | 15 | 24 | 66 | 74 | 75 | 90 | 100 | 100 | 100 | 85 | 75 | ... | 0 | 15 |
| | 0 | 0 | 10 | 13 | 15 | 26 | 66 | 74 | 75 | 90 | 100 | 100 | 100 | 85 | 75 | ... | 0 | 16 |
| | 0 | 0 | 10 | 13 | 15 | 26 | 66 | 74 | 75 | 90 | 100 | 100 | 100 | 85 | 75 | ... | 0 | 17 |
| | 0 | 0 | 10 | 13 | 15 | 27 | 66 | 74 | 75 | 90 | 100 | 100 | 100 | 87 | 75 | ... | 0 | 18 |
| | 0 | 0 | 10 | 13 | 15 | 27 | 66 | 74 | 75 | 90 | 100 | 100 | 100 | 87 | 75 | ... | 0 | 19 |
| | 0 | 0 | 10 | 13 | 15 | 28 | 66 | 74 | 75 | 90 | 100 | 100 | 100 | 88 | 75 | ... | 0 | 20 |
| | 0 | 0 | 10 | 14 | 15 | 28 | 66 | 75 | 75 | 90 | 100 | 100 | 100 | 89 | 75 | ... | 0 | 21 |
| | 0 | 0 | 10 | 14 | 20 | 29 | 67 | 75 | 80 | 90 | 100 | 100 | 100 | 90 | 85 | ... | 0 | 22 |
| | 0 | 0 | 10 | 14 | 20 | 30 | 67 | 77 | 80 | 90 | 100 | 100 | 100 | 90 | 85 | ... | 0 | 23 |
| | 410a | 410b | 410c | 410d | 410e | 410f | 410g | 410h | 410i | 410j | 410k | 410l | 410m | 410n | 410o | ... | 410p | |

FIG. 4

ADAPTIVE THERMAL COMFORT LEARNING FOR OPTIMIZED HVAC CONTROL

CROSS-REFERENCE TO RELATED APPLICATION(S)

This application claims the benefit of U.S. Provisional Patent Application No. 62/878,303, entitled "ADAPTIVE THERMAL COMFORT LEARNING FOR OPTIMIZED HVAC CONTROL," filed on Jul. 24, 2020. This application is related to U.S. patent application Ser. No. 15/476,857, titled "ORCHESTRATED ENERGY," filed on Mar. 31, 2017, which claims the benefit of U.S. Provisional Patent Application No. 62/317,426, titled "ORCHESTRATED ENERGY," filed on Apr. 1, 2016. Each of the above-mentioned applications is hereby incorporated herein by reference in its entirety.

TECHNICAL FIELD

The present technology generally relates to systems and methods for managing and optimizing thermal comfort.

BACKGROUND

As energy resources become scarcer, and as people become more environmentally conscious, their desire to optimize energy consumption and reduce costs has increased. Although there have been many attempts to improve energy conservation and reduce energy costs, these attempts do not typically satisfy the demands or goals of customers and/or utilizes or coordinates between the goals of those customers and utilities. For example, demand management systems (direct load control systems) enable utilities to essentially turn off end-user devices (e.g., air conditioning units) when demand peaks to, for example, avoid blackouts or rolling brownouts. However, end-users may not receive notice of the shutoff and may find themselves uncomfortable at inopportune times. As another example, a user can use a thermostat to create a temperature schedule for a building, so that the user remains comfortable while occupying the building. However, the schedules may not take into account the cost of energy, thereby ignoring any potential for cost savings to the user, the utility, or both in a market that can have volatile pricing. Furthermore, while the "Internet of Things" has created a wealth of sensors and other devices within various energy systems to measure both the energy consumption of the system and the environment within which the system operates, these sensors do not often communicate effectively.

Residential heating, ventilation, and air conditioning (HVAC) systems are typically controlled very simply with closed-loop control algorithms that dutifully follow simple rules set by, for example, a homeowner, building manager, etc. Typically being the largest energy consumer in a building, the efficient operation of the HVAC system is critical to reducing energy cost and consumption. Programmable thermostats have long been thought of as a solution to this problem. However, building owners and managers have little knowledge about how best to program their HVAC systems. Particularly, owners may not be able to accurately estimate the boundaries of their comfortable temperature range when programming their thermostats.

Some solutions are already available on the market for self-programmable thermostats which seek to promote energy efficiency and comfort, primarily from Nest Labs Inc. For example, Nest Labs' patent "Energy Efficiency Promoting Schedule Learning Algorithms For Intelligent Thermostat" (U.S. Pat. No. 9,298,196 B2) seeks to promote energy efficiency by resetting a user's temperature to a more energy efficient temperature after the duration of a manual intervention with the thermostat. Other conventional systems make incremental adjustments from an originally programmed schedule towards a more energy efficient schedule, including responses to user feedback either positive or negative to the adjustments. However, these systems do not attempt to learn the boundaries of the user comfort preferences to inform how this energy efficient temperature is set.

BRIEF DESCRIPTION OF THE DRAWINGS

FIG. 3 is a table diagram illustrating historical data.

FIG. 4 is a table diagram illustrating comfort surface data.

DETAILED DESCRIPTION

Figure 1:
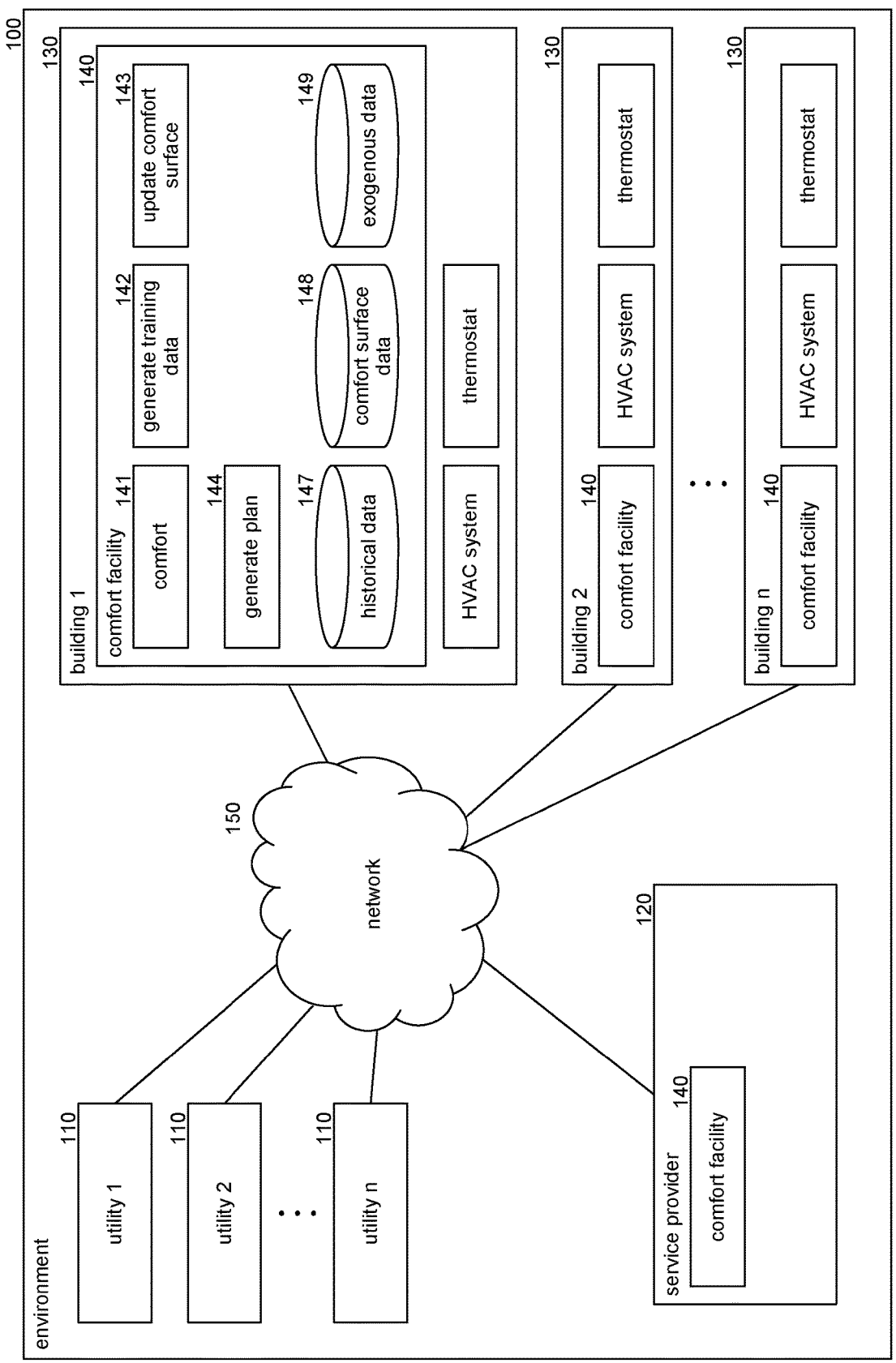
FIG. 1 is a block diagram illustrating an environment in which the facility may operate.

The present technology provides systems and methods that overcome drawbacks experienced in the prior art and that provide other benefits. For example, the present technology provides one or more control solutions that does not rely on single temperatures for comfort levels but rather a range of temperatures for comfort levels. This would greatly improve the ability of a thermostat to provide efficient thermostat control while maintaining user comfort and optimizing other objectives (e.g., total cost, energy efficiency, etc.). A comfort-based energy control facility (the "comfort facility" or "facility") providing systems and methods for controlling an HVAC system in accordance with an individual's (or group of individuals') demonstrated comfort preferences is disclosed. In some embodiments, the facility constructs a comfort surface, which provides a measure of a user's comfort under corresponding conditions, and uses the comfort surface to create a plan for controlling an HVAC system, such as a set of inputs or control instructions for a thermostat. The plan may, for example, define one or more temperature setpoints within the range of comfortable temperatures for controlling temperature within one or more zones (e.g., rooms or areas within a building) over the course of a day, week, month, etc.

In constructing the plan, the facility is configured to estimate the level of comfort and/or discomfort that one or more individuals (e.g., users) will experience during execution of the plan. In this manner, the facility can account for comfort preferences in addition to other aspects of energy management, such as energy costs, demand, etc. Accurately estimating user comfort bounds (i.e., range of comfortable temperatures or "comfort range") based on user estimated preferences and user interactions as a function of comfort and/or discomfort levels substantively improves the operations of an HVAC system as it (a) provides an estimate of user comfort across a range of internal temperatures, and under various conditions, which can be used as an input to any optimization to programming an HVAC system, and (b)

potentially discovers a wider or different range of comfortable temperatures or HVAC configurations, including temperatures that could improve the optimized solution, which the user did not originally program into or otherwise identify as being within their comfortable range. Thus, the disclosed facility provides improvement to HVAC control technology in terms of efficiency, user comfort, and potential cost savings.

When the facility is first installed or enabled in a building (which includes a house, room, suite, or other inhabitable structure), initial information about the estimated comfort preference of the building is generated based on input provided by the user and/or generic information on the comfort preferences of a typical user. After installation, manual interactions of the user with the thermostat are observed, where interactions may refer to any type of manual or user generated change made to the thermostat's settings. The characteristics of that interaction, including but not limited to the extent to which that interaction changes the state of the HVAC system, are used to determine if the interaction is indicative of a user's discomfort and the nature of that discomfort (e.g., too hot or too cold). This data is used to categorize regular time intervals (e.g., hourly) into "comfortable" and "uncomfortable," whereby a time period is considered comfortable if no such discomfort interaction occurred within the time period and uncomfortable if such an interaction did occur. In addition to collecting information on these interactions passively, the facility may also attempt to actively prompt user interactions with the thermostat through temperature changes, where these temperature changes may be tailored towards achieving a particular objective (e.g., cost savings, energy efficiency, load shift, etc.).

Besides recording the timing and nature of these user interactions, the facility can also observe temperatures and other exogenous factors, such as outdoor temperature, time of day, day of week, user-designated sleep periods, user-designated home periods, occupancy, seasonal information, actual or forecasted weather conditions, etc., during these time periods. Estimates of a user's comfort preferences at unique combinations of temperature and exogenous factors can then be estimated based on the observation of estimated comfort levels during the periods when that combination of features is present, generating the user's comfort surface. These estimates may also be augmented by observations when similar combinations of features are present, in a degree related to this similarity, where "similarity" refers to some function capturing the degree of difference between two sets of features. This produces estimates of a user's comfort preferences under all previously observed conditions as well as under similar or related conditions, including potentially more energy efficient temperatures that the user may not have originally programmed or otherwise identified as being comfortable. It is noted that the facility can produce a comfort surface, which depends on, among other exogenous factors, the time of day. A comfortable range of temperatures for a user for one time period (e.g., between 5 p.m. to 10 p.m.) may be different than the comfortable range of temperatures for the user during a different time period (e.g., 11 p.m. to 5 a.m.). Therefore, once the comfort surface is defined, that surface can be used to select a daily schedule of setpoints in accordance with these time-varying comfort preferences. The facility can then generate a plan and initiate the appropriate temperature adjustments to the user's setpoint schedule. Under the new setpoint schedule, the facility can again monitor user interactions, and in some embodiments, update the user's comfort surface to generate the next setpoint schedule if necessary. The facility may iterate these steps multiple times to identify a user's true and/or wider comfort range in conjunction with meeting particular objectives.

In some embodiments, the facility may begin by constructing or initializing a surface and comfort range for each of one or more individual users. A comfort surface represents, for each of a number of combinations of conditions (e.g., indoor temperature, outside temperature, time of day, day of week, etc.) and for each of a number of HVAC control settings (e.g., thermostat setpoint settings, fan settings, etc.), a data structure or functional form (e.g., a probability distribution) that provides a link between the conditions and a measurement of comfort. The measurement of comfort can comprise rankings, numeric ratings, direct user feedback, probability distributions, or point estimate probabilities. In some embodiments, the measurement of comfort can also be a functional form. In some embodiments, points on the comfort surface can be represented by parameters of a probability distribution, such as a beta distribution.

In other embodiments, the comfort surface can be defined over a continuous set of points, jointly distributed according to a multivariate probability distribution, such as a multivariate Gaussian distribution. In other embodiments, the measurement of comfort can be a point estimate of probabilities that a particular user is or would be comfortable across discretized points on the comfort surface. It is noted that a point estimate of probabilities can be derived from the parameters of the probability distribution (e.g., beta distribution or Gaussian distribution). For example, the facility may calculate the median or mean of the probability distribution under certain conditions (e.g., indoor temperature, time of day, etc.). As a first example, a comfort surface for one user, where the measurement of comfort is defined as a point estimate probability, may indicate that when the outside temperature is 45 degrees Fahrenheit (° F.) and it is 5 p.m. on a Wednesday, that there is a 20% chance that the user would be comfortable (i.e., an 80% chance that the user would not be comfortable or would experience discomfort) if the thermostat were set to 64° F., a 30% chance if the thermostat were set to 65° F., a 40% chance if the thermostat were set to 66° F., a 50% chance if the thermostat were set to 67° F., an 84% chance if the thermostat were set to 68° F., an 80% chance if the thermostat were set to 69° F., a 75% chance if the thermostat were set to 70° F., a 50% chance if the thermostat were set to 72° F., a 30% chance if the thermostat were set to 73° F., and a 0% chance if the thermostat were set below 64° F. or above 73° F.

As a second example, the comfort surface for the same user may indicate that when the outside temperature is 77° F., the humidity is 80%, and it is 2 p.m. on a weekend, that there is a 95% chance that the user would be comfortable if the thermostat were set to 67° F., an 80% chance if the thermostat were set to anywhere between 63° F. and 65° F. or 68° F. and 72° F., and a 0% chance if the thermostat were set anywhere else. In some embodiments, a user's comfort range may be selected based on this comfort surface to include temperatures in which the corresponding probability for comfort is greater than a certain percentage (e.g., default 80%).

In the first example, the user's comfort range would be defined as 68° F.-69° F. when the outside temperature is 45° F. and it is 5 p.m. on a Wednesday. In the second example, the user's comfort range would be defined as 63° F.-65° F., 67° F., and 68° F.-72° F. when the outside temperature is 77° F., the humidity is 80%, and it is 2 p.m. on a weekend. In some embodiments, the facility may initialize a comfort surface by setting each probability in the comfort surface to a predetermined value (e.g., 0%, 50%, 75%, etc.) or by setting the probabilities to values provided by a user, administrator, or another system. In some cases, the facility may use average values collected from comfort surfaces associated with other users as a way to initialize a comfort surface.

In some embodiments, the facility may derive an initial comfort surface from a user's selected comfort range or based on their programed setpoint schedule. For example, the facility may prompt a user to select a range of temperatures that the user will be comfortable under select conditions such as time of day and day of the week. The user may provide a schedule and HVAC setting preferences (e.g., a comfort range) for various segments of that schedule. The facility may then assign a comfort surface based on this range. As disclosed in embodiments of the present technology, the facility may assign a probability distribution(s), individual probabilities, numeric ratings, etc. as the comfort surface. For example, if a user inputs a comfort range of 66° F.–70° F. during evenings (e.g., 5 p.m. to 9 p.m.), the facility may assign an 80% chance that the user will be comfortable at 66° F., a 100% chance at 68° F., and an 80% chance at 70° F. during the hours of 5 p.m. to 9 p.m. In another example, if the user inputs a comfort range of 64° F. to 66° F. during a sleep block (e.g., 9 p.m. to 6 a.m.), the facility may assign an 80% chance that the user will be comfortable at 64° F., a 100% chance at 65° F., and an 80% chance at 66° F. during the hours of 9 p.m. to 6 a.m.

In some embodiments, the system can also be configured to test the boundaries of a user's comfort range to determine a user's true and/or wider comfort range. For example, the facility may select setpoint temperatures for a given schedule from a range of temperatures that is outside of the user's currently estimated comfort range (i.e., a "test range"), thereby pushing the user's boundaries to identify a range that the user may not have previously selected but at which the user may still be comfortable. The test range can be determined by any number of algorithms not limited to a risk tolerance factor or the methods disclosed herein. The test range balances the value of obtaining new information (e.g., setting a more extreme temperature setpoint) with the value of exploiting current information (i.e., respecting the current estimates of comfort). In some embodiments, the facility may sample from the probability distribution(s) of the comfort surface to estimate the user's comfort range and generate the test range. In some other embodiments, the facility may initiate a wider test range and adjust the test range based on monitoring user feedback and calculating point estimate probabilities. In some other embodiments, the facility may determine the test range based on a risk tolerance factor. For example, with a risk tolerance factor of 40%, the facility may select a range of temperatures in which the user is estimated to be comfortable with a 48% or greater chance, given that the user's comfort range includes temperatures corresponding to an 80% or greater chance that the user will be comfortable (60% of 80%). In some embodiments, the risk tolerance may be set to a default value (e.g., 75%) and may be adjustable by a user or administrator, a utility, the facility itself, and so on.

In some embodiments, once a comfort surface, a comfort range, and a test range are discovered, the facility may select setpoints from within this range of temperatures to optimize some objective function. For example, to optimize energy efficiency, such selection may be performed by a simple heuristic such as selecting the top of the range of temperatures during periods when the user is likely to be cooling their home, or the bottom during periods when the user is likely to be heating their home. This selection may also be performed by more advanced algorithms, such as programmatic optimization as described in U.S. patent application Ser. No. 15/476,857, entitled ORCHESTRATED ENERGY, filed on Mar. 31, 2017 (which is incorporated herein by reference thereto), where the range of temperatures is provided as constraints to the algorithm. In some embodiments, the comfort surface itself may be provided as an input to the optimization without first deriving a range of temperatures from the surface. For example, the optimization can seek to maximize comfort as the objective function given the comfort surface. This would allow the optimization to be performed with respect to more complicated objectives, such as total cost, load shift, etc.

In some embodiments, the facility is configured to monitor changes (or lack thereof) to the HVAC system (e.g., changes to thermostat settings, fan settings, etc.) to assess a user's comfort level at various times. In embodiments of the present technology, a user-initiated change, which initiates a change in the state of the HVAC system, is considered an indication that the user is not comfortable, and no change indicates that the user is comfortable (or "comfortable enough"). In the current embodiment, the system can record a level of discomfort as "too hot" or "too cold" based on the change in the state of the HVAC system, but independent of the extent of the change. For example, if a user increases a thermostat setpoint from 65° F. to 75° F. when the recorded internal temperature was 70° F., then the system can prompt the HVAC system to stop cooling and record that the user was experiencing a level of discomfort as "too cold" at the recorded internal temperature of 70° F. In another example, if a user increases a thermostat setpoint from 65° F. to 67° F. when the recorded internal temperature was 66° F., then the system can similarly prompt the HVAC system to stop cooling and record that the user was experiencing a level of discomfort as "too cold" at the recorded internal temperature of 66° F. In this embodiment, the recorded level of discomfort of "too cold" is the same in both examples when the changes prompted in the state of the HVAC system are the same (e.g., stopped cooling). In some other embodiments, the facility can be configured to record the degree or extent of the change (e.g., −5° F., +7° F., −10%, +22%, etc.). For example, if the user adjusts the setpoint from 65° F. to 67° F., then the facility can record that the user was experiencing some level of discomfort, although not necessarily to the same extent as when the user adjusts the setpoint from 65° F. to 75° F. In some other embodiments, the facility may also periodically estimate and/or record the user's (or group of users') probability of comfort under the same or other conditions. For example, a user who has a 75% probability of being comfortable within a home at 67° F. will likely be comfortable in the same home at 66° F. and 68° F. but may not be at 57° F. or 77° F. In some embodiments, from monitoring user-initiated changes and recording exogenous factors, the facility may store this as historical data. From the historical data, the user's comfort surface may be updated, a new comfort range may be identified, and the facility may generate a plan or update a plan.

The facility can thus encompass a two-phase process of (1) discovering the comfort surface of a user, including a full range or set of ranges of comfortable temperatures and conditions, up to and including the boundary between comfort and discomfort for a user, given certain exogenous factors, and (2) selecting a setpoint schedule for this user based on the comfort surface or from within the full range or set of ranges according to any desired optimization algorithm. These two phases can repeat indefinitely or repeat in accordance with a set schedule, input from a user (e.g., an individual user, administrator, etc.), or other parameters.

In embodiments of the present technology, the facility can include (a) an initial identification about a user's comfort preferences, which is also sufficient to make decisions related to comfort before actual use data for a user becomes available, (b) differentiation between comfortable and uncomfortable conditions based on a user's interactions with their thermostat during periods when those conditions existed, which may be passively recorded or actively prompted via setpoint changes designed to test comfort limits, (c) sharing observations of comfort or discomfort across similar conditions to inform estimates of comfort or discomfort at previously unrecorded or rarely recorded conditions, and (d) the identification of the boundaries of a user's comfort creating a range of comfortable temperatures to be selected from in an optimization process. The facility improves upon HVAC control systems by deriving a range of actual comfortable temperatures during defined or selected periods, rather than a single temperature, which allows for an optimization of the setpoint schedule according to any desired optimization algorithm and under any desired objective function, while still constraining temperature to remain within users' comfort bounds and/or incorporating the level of comfort and/or discomfort directly in the objective function. The facility is usable to improve energy efficiency in addition to any number of other objectives, such as cost effectiveness, load shift, etc.

FIG. 1 is a block diagram illustrating an environment in which the facility may operate in accordance with some embodiments of the disclosed technology. In this example, environment 100 include utilities 110, service providers 120, buildings 130, and network 150. Utilities 110 represent entities, such as public utilities, that provide infrastructure and access to various resources, such as electricity, gas, sewage, water, etc. Buildings 130 represent buildings that each include one or more comfort zones that is or can be controlled by a comfort facility 140 that analyzes historical data, comfort surface data, and exogenous data and provides control instructions for controlling a thermostat in accordance with comfort preferences and/or historical actions. In this example, each of the buildings 130 includes a comfort facility 140, an HVAC system, and a thermostat although one of ordinary skill in the art will recognize that the facility need not execute or exist at or within the building itself. For example, the service provider 120 may provide access to a comfort facility 140 via a network 150 to a building that provides data (e.g., historical data, comfort surface data, and exogenous data) from the building. As another example, a comfort facility 140 at or within one building may provide comfort-based energy control instructions to a thermostat within another building that does not include or maintain its own facility.

In this example, comfort facility 140 includes a comfort component 141, a generate-training-data component 142, an update-comfort-surface component 143, a generate-plan component 144, a historical-data store 147, a comfort-surface-data store 148, and an exogenous-data store 149. The comfort component 141 is invoked by the facility to generate a set of control instructions for a thermostat to control settings (e.g., HVAC settings) within a zone and provide those instructions to one or more thermostats or thermostat controllers. The generate-training-data component 142 is invoked by the comfort facility 140 to analyze and consolidate data related to user interactions with an HVAC system and exogenous conditions for use by the facility. The update-comfort-surface component 143 is invoked by the comfort component 141 to adjust or update a comfort surface based on the training data. The generate-plan component 144 is invoked by comfort component 141 to generate a set of thermostat control instructions based on an analysis of the comfort surface. Historical-data store 147 stores information related to user interactions with the HVAC system, such as adjustments to a thermostat, adjustments to fan settings, adjustments to air conditioning settings, and so on. In some environments, interactions with the HVAC system may be associated with a user or they may be anonymous. The comfort-surface-data store 148 stores comfort surface information for one or more users.

Each comfort surface represents, for each of a plurality of conditions, an estimate of a level of comfort that a user (or group of users) experiences under those conditions. The estimate of the level of comfort may be represented by a probability, functional form, numeric rating, etc. In some embodiments, the comfort surface provides an indication of how likely it is that a set of conditions will result in a manual adjustment to one or more HVAC settings. Exogenous data store 149 stores exogenous data related to an HVAC system, such as weather information, indoor atmosphere conditions, information about a building, etc. In some embodiments, the systems and various components of environment 100 communicate via network 150 or directly via wired or wireless communication connections (e.g., radio frequency, WIFI, and BLUETOOTH).

The computing devices on which the disclosed systems are implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the technology, e.g., a computer-readable medium that contains the instructions. In addition, the instructions, data structures, and message structures may be stored or transmitted via a data transmission medium, such as a signal on a communications link and may be encrypted. Non-transitory computer-readable media include tangible media such as storage media, hard drives, CD-ROMs, DVD-ROMS, and memories such as ROM, RAM, and Flash memories that can store instructions. Signals on a carrier wave such as an optical or electrical carrier wave are examples of transitory computer-readable media. Furthermore, "computer-readable devices" includes input, output, storage, and other devices but does not include transitory, propagating signals. Various communications links may be used, such as the Internet, a local area network, a wide area network, a point-to-point dial-up connection, a cell phone network, and so on.

The disclosed systems may be described in the general context of computer-executable instructions, such as program modules, executed by one or more computers or other devices. Generally, program modules include routines, programs, objects, components, data structures, and so on, that perform particular tasks or implement particular abstract data types. Typically, the functionality of the program modules may be combined or distributed as desired in various embodiments.

Many embodiments of the technology described herein may take the form of computer-executable instructions, including routines executed by a programmable computer. Those skilled in the relevant art will appreciate that aspects of the technology can be practiced on computer systems other than those shown and described herein. Embodiments of the technology may be implemented in and used with various operating environments that include personal computers, server computers, handheld or laptop devices, multiprocessor systems, microprocessor-based systems, programmable consumer electronics, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any data processor and can include Internet appliances and handheld devices (including palmtop computers, wearable computers, cellular or mobile phones, multi-processor systems, processor-based or programmable consumer electronics, network computers, mini computers and the like). Information handled by these computers can be presented at any suitable display medium, including a cathode ray tube display, liquid crystal display, light emitting diode display, plasma display, and so on.

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Data structures and transmissions of data particular to aspects of the technology are also encompassed within the scope of the technology. For example, various systems may transmit data structures and other information using various protocols, such as the hypertext transfer protocol (HTTP), the transmission control protocol (TCP), the OpenTherm protocol, the ZigBee protocols, and so on.

Figure 2:
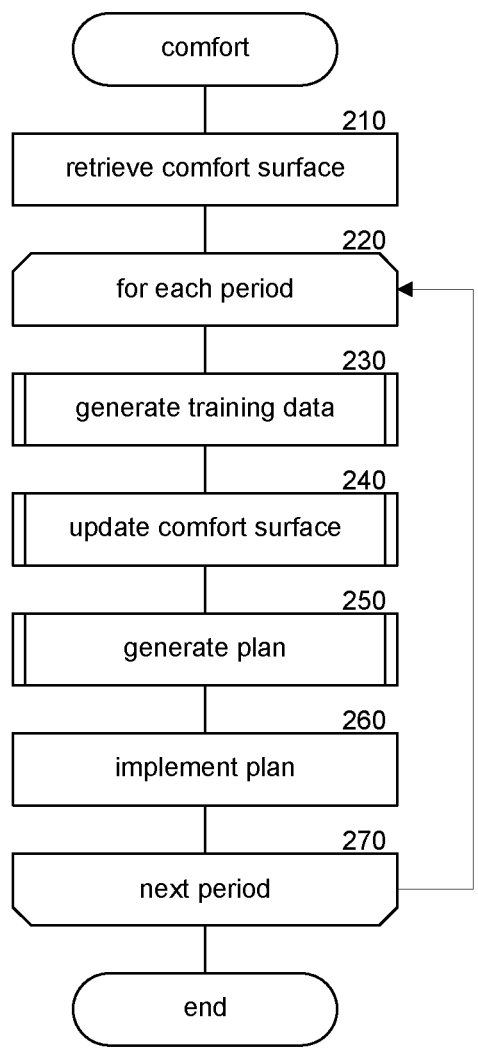
FIG. 2 is a flow diagram illustrating the processing of a comfort component.

FIG. 2 is a flow diagram illustrating the processing of a comfort component in accordance with some embodiments of the disclosed technology. The comfort component is invoked by the facility to analyze comfort surface data and generate a set of thermostat control instructions for controlling a thermostat over a period of time in accordance with the corresponding comfort surface. In some examples, the facility may invoke the comfort component periodically (e.g., once a day, once a week, once a month, etc.) to generate a plan for one or more future periods (e.g., the following 24 hours, the following five days, the following four weekends, the following month, etc.). In some examples, the facility may be prompted by a user to invoke the comfort component to generate a plan. In some examples, the comfort component may be invoked in response to a predetermined number of user adjustments. For example, if the facility determines that a user is frequently (e.g., more than once a day, more than three times a week, etc.) adjusting the temperature in a zone, the facility may invoke the comfort component to generate a new plan in accordance with an updated comfort surface. In block 210, the component retrieves a corresponding comfort surface from a comfort surface data store. For example, if the component has been invoked for a particular user, then the facility may retrieve comfort surface data corresponding to that user and the zone. As another example, the facility may retrieve a general comfort surface for the zone if a user is not identifiable or if no user-specific comfort surfaces exists. Alternatively, if no corresponding comfort surface exists, the component may create a new comfort surface and initialize the new comfort surface by, for example, setting the parameters of the comfort surface to predefined values across the surface according to a predefined function or by combining (e.g., calculating the mean, median, or mode) values from other comfort surfaces (e.g., comfort surfaces for other zones, or other users, or other buildings, etc.). In blocks 220 to 270, the component loops through each period for which a plan is to be generated and generates a plan for the corresponding period. In block 230, the component invokes a generate training data component to generate training data used to generate a plan for the corresponding period. In block 240, the component invokes an update comfort surface component to update the retrieved comfort surface with any new data. In block 250, the component invokes a generate plan component to generate a set of control instructions for the corresponding period. In block 260, the component implements the generated plan by, for example, sending the plan and its corresponding control instructs to a thermostat to control the thermostat in accordance with the generated plan. In block 270, the component loops back to block 220 to generate a plan for the next period.

One of ordinary skill in the art will recognize that individual comfort surfaces may be generated for individual users in any number of zones and that HVAC settings can be controlled in accordance with any comfort surface. Similarly, one of ordinary skill in the art will recognize that a single comfort surface may be generated for a group of users (whether they be identifiable or anonymous) based on interactions by those users and that HVAC settings can be controlled in accordance with any comfort surface. The facility can be used to efficiently control settings for a single user in a single-person household, for multiple users in a single-family household, for multiple users in a publicly available zone, and so on.

FIG. 3 is a table diagram illustrating historical data in accordance with some embodiments of the disclosed technology. In this example, table 300 consists of rows 300-399, each row including data for several represented columns, including: a user column, a day(s) column, a time column, a thermostat setting column, an inside temperature column, an outside temperature column, a humidity column, a comfortable column, and a not comfortable column. In this example, the historical data of table 300 represents information that has been recorded for a single zone and for a plurality of users. Each of rows 301-310 includes information that the facility can use to determine the probability that a user will be comfortable (or uncomfortable) under conditions represented in the row and/or the data represented in rows of related or similar conditions.

The user column includes user identification information, such as a unique identifier. In this example, table 300 includes information for multiple users, include user 0001 and user 0002. In the illustrated embodiment, row 310 does not include any user identification information, indicating that this information can be used for a generic user (or group of users) or when a user is not identifiable. In this manner, the historical data can be used for specific users (e.g., users 0001 and 0002) or for general users. The day(s) column identifies the days of the week for which the historical information in the row is relevant. For example, the historical information in row 301 is relevant to weekends (i.e., Saturday and Sunday), and the historical information in row 306 is relevant to weekdays (i.e., Monday, Tuesday, Wednesday, Thursday, and Friday), while the historical information in row 310 is relevant to every day of the week. The time column identifies a relevant time window, which may be of any level of granularity (e.g., 5 minutes, 30 minutes, 1 hour, 4 hours, and so on). In this example, each time window is 30 minutes. Thus, the historical information in row 305 is relevant to weekdays between 6 a.m. and 6:30 a.m. while the comfort information in row 308 is relevant to Tuesday and Thursday between 2:30 p.m. and 3:00 p.m.

The thermostat setting column indicates the thermostat setting (in degrees Fahrenheit) associated with the corresponding historical information. The inside temperature column indicates the indoor temperature (in degrees Fahrenheit) associated with the corresponding historical information. The outside temperature column indicates the outdoor temperature (in degrees Fahrenheit) associated with the corresponding historical information. The humidity column indicates the relative humidity of the outdoor air associated with the corresponding historical information. The comfortable column indicates the number of times that (or the extent to which), under the conditions defined within the corresponding row (or similar conditions), the relevant user (or group of users) was determined to be comfortable. The "not comfortable" column indicates the number of times that (or the extent to which), under the conditions defined within the corresponding row (or similar conditions), the relevant user (or group of users) was determined to be uncomfortable. For example, if a user adjusts the thermostat by 4° F., this 4° F. change can be recorded as an indication that the user was not comfortable with a weighted score of 4 under the "not comfortable" column, and if there is no user interaction, this lack of change can be recorded with a weighted score of 5 under the comfortable column.

In some embodiments, the facility may record user interactions without a weighted score and record only the number of times a user had an interaction (or lack thereof) with the thermostat in a given period. For example, the facility can record in binary of the user as being "too hot" or "too cold" independent of the degree that the user adjusts the thermostat. One skilled in the art will appreciate that the "comfortable" and "not comfortable" times may be tabulated in any number of ways with any number of different weighting scales. Thus, on weekends between 3:00 p.m. and 3:30 p.m., when the thermostat is set to 70° F., the indoor temperature is 70° F., the outside temperature is 75° F., and the relative humidity is 20%, user 0001 was found to be comfortable 42 times and uncomfortable 37 times (see row 304). Accordingly, in a simple embodiment, the facility can use the information in row 304 to determine that user 0001 has a 0.5316 (42/42+37) probability (53.16%) of being comfortable under those conditions. As another example, the same user has a 0.0 (0/0+51) probability (0%) of being comfortable on weekends between 1:00 p.m. and 1:30 p.m. when the outside temperature is 75° F., the relative humidity is 20%, and the thermostat is set to 73° F. In other embodiments, the comfortable or uncomfortable counts may be used to update a probability distribution, such as a beta distribution, or numerical comfort ratings may be used to update a multivariate Gaussian distribution. Accordingly, each row in table 300 can be used to determine the level of comfort and/or discomfort, or some scale such as, the probability for a user or group of users. These probabilities can then be stored as comfort surface data such as in FIG. 4.

One skilled in the art will appreciate that, while FIG. 3 provides an illustration that is easily comprehensible by a human reader, the actual information may be stored using different data structures and data organizations. The comfort surface may or may not be discretized as illustrated in FIG. 3. The comfort surface may also be a functional form that links conditions to a comfort measurement without the use of a lookup table. Moreover, one of ordinary skill in the art will recognize that a historical data store may store information for any number of users and/or zones and that any number of attributes may be recorded in association with the historical data store. For example, the historical data store may include additional information, such as building or zone identification information, location information, and so on. Similarly, the historical data store of FIG. 3 may be amended to remove one or more columns. In some examples, the facility may maintain separate historical data stores for individual users, individual buildings, individual zones, or any combination thereof.

FIG. 4 is a table diagram illustrating simple comfort surface data in accordance with some embodiments of the disclosed technology. In this example, table 400 represents a simple comfort surface, where the measurement of comfort is chosen to be defined by point estimates of probabilities. Table 400 provides, for any day of the week and for each of a plurality of thermostat settings ranging from 50° F. to 79° F. (rows 410*a-p*) and a plurality of one-hour time windows (columns 420), a probability that the represented users (or group of users) would be comfortable when the outside temperature is 55° F. The earliest time window, represented by "0", corresponds to the first hour of the day (i.e., midnight to 12:59:59 a.m.) and the latest time window, represented by "23", corresponds to the last hour of the day (i.e., 11:00 p.m. to 11:59:59 p.m.). In some embodiments, a kernel function can be used to share information across similar conditions, such that even if the user has never indicated discomfort under certain conditions, there may still be some probability that the user will be uncomfortable under these conditions. In some other embodiments, the facility can assign a 100% chance that the user would be comfortable under these conditions. If the user were to adjust the temperature under these conditions, however, the facility could update the comfort surface to reflect this indication of discomfort.

Further, table 400 shows that as the thermostat setting gets further and further away from 68° F. while the outdoor temperature is 55° F., the probability that the user is likely to be comfortable drops and is 0% at thermostat settings of 50° F. and 78° F. In some embodiments, initial comfort surface data may be generated based on input provided by the user and/or generic information of a typical user. As the facility collects more historical data on the user, the comfort surface data can be updated with new estimates of how comfortable the user would be under associated conditions. For example, if the comfort surface comprises parameters of a beta distribution, the facility can update the parameters of the beta distribution based on new counts of comfortable or uncomfortable time periods that have been recorded and their associated conditions using a kernel function to share information across similar conditions to those actual counts and/or conditions recorded. To derive a point estimate, the facility can select a median probability or randomly sample from the beta distribution to generate a point estimate probability. In some embodiments, the range of temperatures that define a user's comfort range may then be set by cutoff probabilities which exclude or include these point estimates. For example, the facility may set this cutoff at 80%, wherein the temperatures that are included in the test range are those in which a user is estimated to be comfortable with an 80% or greater chance. In this example, based on the comfort surface data in FIG. 4, a user's comfort range would be defined as 66° F.–70° F. at 8 a.m.

One skilled in the art will appreciate that while FIG. 4 provides an illustration that is easily comprehensible by a human reader, the actual information may be stored using different data structures and data organizations. One of ordinary skill in the art will recognize that a comfort surface data may be generated for any number of conditions or groups thereof. For example, the facility may generate additional comfort surface data for outside temperatures of 56° F., 60° F., 75° F., and so on and for additional dimensions, such as occupancy levels, indoor humidity, days of the week, and so on. Furthermore, any number of these dimensions may be "bucketized" to represent groups or ranges of values, such as outdoor temperatures ranging from 50° F.–55° F., 56° F.–60° F., etc. Thus, one of ordinary skill in the art will understand that a comfort surface could be used to represent user comfort levels across any number of dimensions and along any level of granularity.

Figure 5:
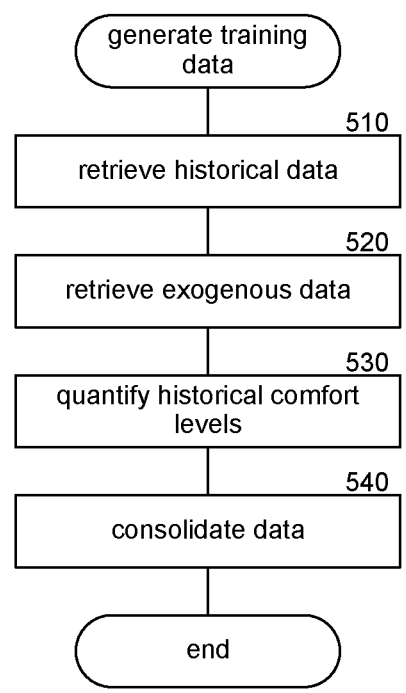
FIG. 5 is a flow diagram illustrating the processing of a generate training data component.

FIG. 5 is a flow diagram illustrating the processing of a generate training data component in accordance with some embodiments of the disclosed technology. The generate training data component is invoked by the facility to combine information from various sources that the facility can use to generate one or more comfort surfaces. In block 510, the component retrieves the historical data representative of user interactions (or lack thereof) with one or more HVAC systems, such as changes to a thermostat, and the extent of those interactions. The historical data may be generated and recorded by the HVAC system itself or may be collected and recorded by the facility. Each time a user interacts with the HVAC system, the HVAC system or facility can log the interaction and the extent of the interaction. For example, if a user adjusts the thermostat by 5° F., this 5° F. change can be recorded as an indication that the user was not comfortable. Similarly, if there are no interactions during a particular period, this lack of an interaction can be recorded as indication that the user was comfortable.

The facility may retrieve the historical data periodically (e.g., once an hour, once every other hour, twice a day, once a week, and so on). In block 520, the facility retrieves exogenous data, such as weather information, atmospheric conditions, etc. This information may be retrieved from sensors or other sources, such as a service that provides weather information. In block 530, the facility quantifies historical comfort levels by determining, for each change to an HVAC setting represented in the historical data, the magnitude and direction of that change and the extent to which that change induces a change in the state of the HVAC. In block 540, the facility consolidates the historical data, including the quantified comfort levels, and exogenous data by, for example, merging the data so that contemporaneous historical and exogenous data are joined together by, for example, performing a SQL JOIN operation on tables storing the data.

Figure 6:
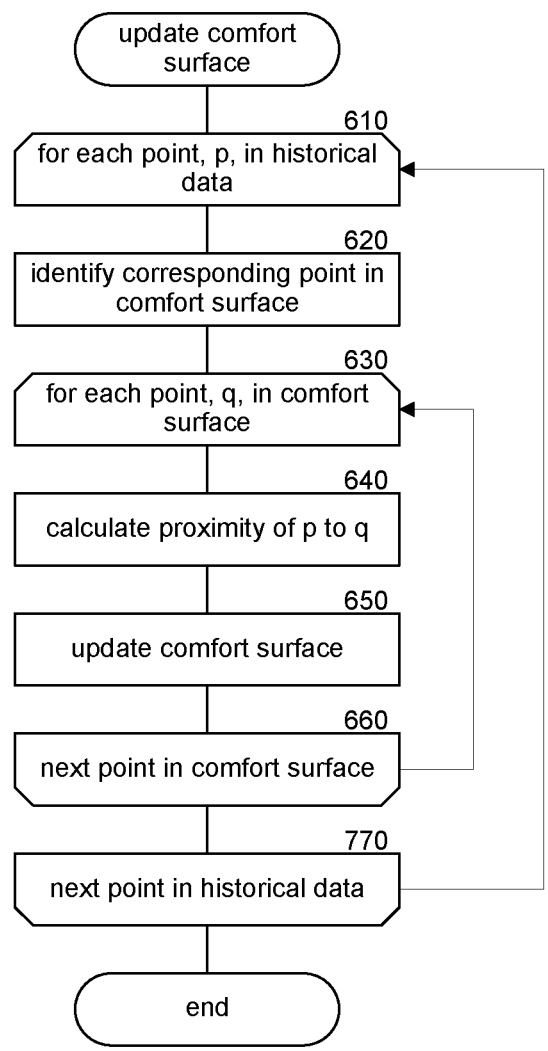
FIG. 6 is a flow diagram illustrating the processing of an update comfort surface component.

FIG. 6 is a flow diagram illustrating the processing of an update comfort surface component in accordance with some embodiments of the disclosed technology. The update comfort surface component is invoked by comfort component to adjust or update a comfort surface based on the training data. In block 610 to 670, the component loops through each point in the historical data to update the retrieved comfort surface. For example, each time a user interacts with the HVAC system and the interaction is recorded in the historical data, or each time a lack of interaction is recorded, the comfort surface is updated.

In block 630 to 660, the component loops through each point in comfort surface for which the comfort surface is to be updated. In block 620, for each point, p, in the historical data, the corresponding point in the comfort surface is identified. Point p represents the exogenous factors (e.g., time of day, day of week, outside temperature, and humidity) recorded in the historical data. For example, if a user manually adjusted the thermostat to change the temperature, the time of day, day of week, outside temperature, and humidity during the adjustment is recorded as point p. In block 640, for each corresponding point, q, in the comfort surface, the proximity of p to q is calculated. Point q represents the exogenous factors as recorded in the comfort surface. The proximity of p to q represents the degree of similarity between the combination of features for a given recording of a user's interaction (or lack thereof) for a given time period as determined by an appropriate kernel function. For example, if the user makes a temperature adjustment at 7 p.m. on a Wednesday when the outside temperature is 66° F. and humidity is 20%, the facility identifies a similarity between this combination of features and all other features contained within the defined space of the comfort surface. In this example, 7 p.m. on a Wednesday when the outside temperature is 67° F. and humidity is 21% may be identified as a similar set of conditions, while 7 p.m. on a Wednesday when the outside temperature is 98° F. and humidity is 45% may be identified as a much less similar set of conditions. In some embodiments, a kernel function can be used to quantify the similarity, such as the distance of a point on the surface with another point. The degree to which these sets of features are different may be used to augment the new estimates of a user's comfort surface.

In some embodiments, a new estimated comfort measurement in the comfort surface is augmented to a degree proportional to the proximity of p to q. In block 650, the comfort surface is updated with, for example, a new probability. In block 660, the component loops back to block 630 for the next point in comfort surface. In block 670, the component loops back to block 610 for the next point in the historical data. For example, if the user manually adjusts the thermostat by +5° F. when indoor temperature is 60° F., outside temperature is 50° F., on a weekend afternoon, this 5° F. change can be recorded as an indication that the user was uncomfortable under these set of conditions. In this example, under a similar indoor temperature, outside temperature, time of day, and day of week, the initial comfort surface can be updated with a new probability that the user is comfortable (or uncomfortable) or comfort measurement.

In some embodiments, the update comfort surface component loops through each time the facility records a user's interaction (or lack thereof) with one or more HVAC systems, such as user-initiated changes to a thermostat. In some embodiments, the update comfort surface component may be initiated when the facility records a user interaction. In some embodiments, the component may be initiated by the user, administrator, and/or facility. One of ordinary skill in the art will understand that the update comfort surface component could be initiated by any number of inputs and any type of input. In some embodiments, the comfort surface may not be updated in full at each iteration in higher dimensions, but may be calculated on an as-needed basis only for the relevant conditions under consideration at the time. For example, the comfort surface may be updated under only specific exogenous conditions, such as an outdoor temperature of 70° F. and humidity of 15% while updating the surface in its entirety across all possible values in two dimensions, such as time of day and indoor temperature. In another example, the comfort surface may be updated with more dimensions, such as time of day, indoor temperature, outdoor temperature, humidity, etc. In some embodiments, the comfort surface may be updated at each iteration in any number of dimensions.

Figure 7:
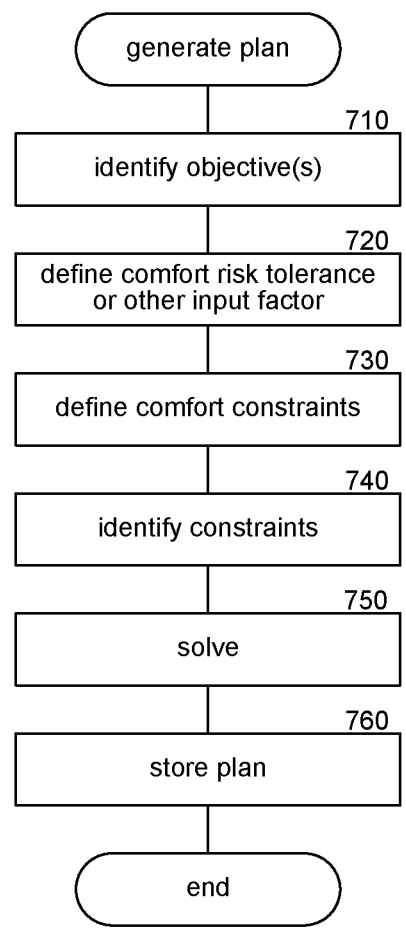
FIG. 7 is a flow diagram illustrating the processing of a generate plan component.

FIG. 7 is a flow diagram illustrating the processing of a generate-plan component in accordance with some embodiments of the disclosed technology. The generate-plan component is invoked by the comfort component to generate a set of thermostat control instructions based on an analysis of the comfort surface. In block 710, the generate-plan component identifies objective(s), such as but not limited to cost effectiveness, load shift, level of comfort, and so on. In block 720, the component defines a comfort risk tolerance (e.g., 60%, 75%, etc.) or other constraints. In some embodiments, the risk tolerance factor may be chosen by default, a user or administrator, a utility, the facility, and so on. In some other embodiments, the comfort surface may not use a risk tolerance factor, and the comfort surface may be used as the input to the optimization to inform constraints or as an input to the objective function. In block 730, the component defines comfort constraints. In some embodiments, comfort constraints include a user's comfort range along with exogenous factors (e.g., time of day, day of week, outside temperature, and humidity). In block 740, the component identifies constraints. These constraints include the temperature range that is tested and from which setpoint temperatures are selected. For example, if a risk tolerance factor is set at 60%, and comfort constraints (i.e., a user's comfort range) are defined as 66° F.–70° F. for a given set of exogenous conditions, the component may identify the constraints (i.e., the test range) to be 64° F.-72° F. In block 750, the component solves constraints to meet particular objectives by identifying setpoint temperatures for a give schedule and exogenous conditions. The facility may solve constraints to meet particular objectives using advanced algorithms, such as programmatic optimization as described in ORCHESTRATED ENERGY. In some embodiments, the component may, for example, generate or modify a plan (e.g., a set of control instructions) based on total cost, level of comfort, risk tolerance, and user preferences. In block 780, the component stores the plan.

Once the plan is generated, the facility can implement the plan to control the thermostat and/or the HVAC system of the building structure so as to keep the environment in the building within the defined temperature ranges to ensure that the user(s) is comfortable within an acceptable level, while achieving the user's identified objectives. Thus, the facility can control the HVAC system directly or via a thermostat to turn on and off the HVAC's heaters and/or chillers at the appropriate times to maintain the suitably comfortable environment in the building structure with much better efficiencies throughout the day based on the determined comfort ranges for the user as calculated via the comfort surface.

From the foregoing, it will be appreciated that specific embodiments of the disclosure have been described herein for purposes of illustration, but that various modifications may be made without deviating from the disclosure. Furthermore, aspects of the disclosure described in the context of particular embodiments may be combined or eliminated in other embodiments. Further, while features and characteristics associated with certain embodiments of the disclosure have been described in the context of those embodiments, other embodiments may also exhibit such features and characteristics, and not all embodiments need necessarily exhibit such features and characteristics to fall within the scope of the disclosure. Accordingly, the disclosure is not limited, except as by the appended claims.

We claim:

1. A method for controlling a heating, ventilation, and air conditioning (HVAC) system, the method comprising:
    constructing a comfort surface data structure, wherein the comfort surface data structure comprises a plurality of entries, each entry comprising one or more time attributes, one or more thermostat settings, one or more environmental attributes, and one or more comfort attributes, wherein each entry in the comfort surface data structure represents a point in a comfort surface, so that the comfort surface is defined by a plurality of comfort surface points;
    for each of a plurality of time periods,
        retrieving historical data and exogenous data,
        quantifying historical comfort levels,
        combining the historical data and exogenous data based on timestamps, and
        for each of one or more historical data points in the combined data,
            mapping the historical data point in the combined data to a corresponding comfort surface point in the comfort surface data structure, and
            for each of one or more comfort surface points in the comfort surface data structure,
                calculating a proximity between the mapped historical data point and the one or more comfort surface points, and
                updating at least one value for the one or more comfort surface points based on the calculated proximity to provide an updated comfort surface;
    generating a plan for controlling a thermostat based on the updated comfort surface, wherein the generating comprises:
        identifying one or more objectives,
        defining one or more comfort constraints based on the updated comfort surface, wherein the comfort constraints comprise a determined comfort preference range related to one or more temperatures; and
        generating a schedule based on the defined one or more comfort constraints and the identified one or more objectives; and
    controlling the thermostat for operation of the HVAC system in accordance with the generated schedule.

2. The method of claim 1 wherein the comfort surface data structure is a continuous data structure.

3. The method of claim 1 wherein the comfort surface data structure is a discrete data structure.

4. The method of claim 1 wherein the comfort surface data structure is configured to determine a user's comfort at a plurality of combinations of internal temperature data and exogenous data.

5. The method of claim 1 wherein updating the at least one value for the comfort surface point in the comfort surface data structure is based on a comfort measurement recorded at the historical data point.

6. The method of claim 1 wherein identifying one or more objectives comprises identifying one or more objectives related to user comfort.

7. The method of claim 1 wherein identifying one or more objectives comprises identifying one or more objectives related to at least one or more of cost savings, energy efficiency, or load shift.

8. The method of claim 1, further comprising actively prompting user interactions with the thermostat through control of the HVAC system to cause temperature changes.

9. The method of claim 8 wherein actively prompting user interactions includes causing changes in accordance with cost savings, energy efficiency, load shift, or other defined objectives.

10. The method of claim 1 wherein the comfort preference range is a first comfort preference range and first and second temperatures define a first temperature range, and further comprising defining a second comfort preference range with a second temperature range outside the first temperature range, and testing comfort constraints based on the second comfort preference range.

11. The method of claim 10, further comprising updating the schedule based on the testing of the comfort constraints, and controlling the thermostat for operation of the HVAC system in accordance with the updated schedule.

12. A method, performed by a computing system, for controlling a heating, ventilation, and air conditioning (HVAC) system, the method comprising:
   constructing, by the computing system, a comfort surface data structure, wherein the comfort surface data structure comprises a plurality of entries, each entry comprising one or more time attributes, one or more thermostat settings, one or more environmental attributes, and one or more comfort attributes, wherein each entry in the comfort surface data structure represents a point in a comfort surface, so that the comfort surface is defined by a plurality of comfort surface points;
   for each of a plurality of time periods,
      retrieving historical data and exogenous data,
      quantifying historical comfort levels,
      combining the historical data and exogenous data based on timestamps, and
      for each of one or more historical data points in the combined data,
         mapping the historical data point in the combined data to a corresponding comfort surface point in the comfort surface data structure, and
         for each of one or more comfort surface points in the comfort surface data structure,
            calculating a proximity between the mapped historical data point and the comfort surface point in the comfort surface data structure, and
            updating at least one value for the comfort surface point in the comfort surface data structure based on the calculated proximity to provide an updated comfort surface;
   generating, by the computing system, a plan for controlling a thermostat based on the updated comfort surface, wherein the generating comprises:
      identifying one or more objectives,
      defining, by the computing system, one or more comfort constraints based on the updated comfort surface, wherein the comfort constraints comprise a determined comfort preference range defined between first and second temperatures, wherein the first temperature is lower than the second temperature; and
      generating, by the computing system, a schedule based on the defined one or more comfort constraints and the identified one or more objectives; and
   controlling the thermostat for operation of the HVAC system in accordance with the generated schedule.

13. The method of claim 12 wherein the comfort surface data structure is a continuous data structure or a discrete data structure.

14. The method of claim 12 wherein the comfort surface data structure is configured to determine a user's comfort at a plurality of combinations of internal temperature data and the exogenous data.

15. The method of claim 12 wherein updating the at least one value for the comfort surface point in the comfort surface data structure is based on a comfort measurement recorded at the historical data point.

16. The method of claim 12 wherein identifying one or more objectives comprises identifying one or more objectives related to at least one or more of user comfort, cost savings, energy efficiency, or load shift.

17. The method of claim 12 wherein actively prompting user interactions includes causing changes as a function of cost savings, energy efficiency, load shift, or other user-defined objectives.

18. The method of claim 12 wherein the comfort preference range is a first comfort preference range and the first and second temperatures define a first temperature range, and further comprising defining a second comfort preference range with a second temperature range outside the first temperature range, and testing comfort constraints based on the second comfort preference range.

19. A non-transitory computer-readable storage medium storing instructions that, if executed by a computing system, cause the computing system to perform a method for controlling a heating, ventilation, and air conditioning (HVAC) system, the method comprising:
   constructing a comfort surface data structure, wherein the comfort surface data structure comprises a plurality of entries, each entry comprising one or more time attributes, one or more thermostat settings, one or more environmental attributes, and one or more comfort attributes, wherein each entry in the comfort surface data structure represents a point in a comfort surface, so that the comfort surface is defined by a plurality of comfort surface points;
   for each of a plurality of time periods,
      retrieving historical data and exogenous data,
      quantifying historical comfort levels,
      combining the historical data and exogenous data based on timestamps, and
      for each of one or more historical data points in the combined data,
         mapping the historical data point in the combined data to a corresponding comfort surface point in the comfort surface data structure, and
         for each of one or more comfort surface points in the comfort surface data structure,
            calculating a proximity between the mapped historical data point and the one or more comfort surface points, and
            updating at least one value for the one or more comfort surface points based on the calculated proximity to provide an updated comfort surface;
   generating a plan for controlling a thermostat based on the updated comfort surface, wherein the generating comprises:
      identifying one or more objectives,
      defining one or more comfort constraints based on the updated comfort surface, wherein the comfort constraints comprise a determined comfort preference range defined between first and second temperatures, wherein the first temperature is lower than the second temperature; and
      generating a schedule based on the defined one or more comfort constraints and the identified one or more objectives; and
   controlling the thermostat for operation of the HVAC system in accordance with the generated schedule.

20. The method of claim 19 wherein the comfort surface data structure is configured to determine a user's comfort at a plurality of combinations of internal temperature data and the exogenous data.

21. The method of claim 19 wherein updating the at least one value for the comfort surface point in the comfort surface data structure is based on a comfort measurement recorded at the historical data point.

22. The method of claim 19 wherein identifying one or more objectives comprises identifying one or more objectives related to at least one or more of cost savings, energy efficiency, or load shift.

23. The method of claim 19, further comprising actively prompting user interactions with the thermostat through control of the HVAC system to cause temperature changes as a function of cost savings, energy efficiency, load shift, or other user-defined objectives.

24. The method of claim 19 wherein the comfort preference range is a first comfort preference range and the first and second temperatures define a first temperature range, and further comprising defining a second comfort preference range with a second temperature range outside the first temperature range, and testing comfort constraints based on the second comfort preference range.

25. The method of claim 24, further comprising updating the schedule based on the testing of the comfort constraints, and controlling the thermostat for operation of the HVAC system in accordance with the updated schedule.

\* \* \* \* \*